United States Patent [19]
Kollonitsch et al.

[11] 3,859,276
[45] Jan. 7, 1975

[54] 7-CHLORO-1,3-DIHYDRO-5-(2-POLYFLUOROALKOXYPHENYL)-2H-1,4-BENZODIAZEPIN-2-ONES

[75] Inventors: Janos Kollonitsch, Westfield; George A. Doldouras, Fanwood, N.J.

[73] Assignee: Merck and Co., Inc., Rahway, N.J.

[22] Filed: Dec. 13, 1972

[21] Appl. No.: 314,633

[52] U.S. Cl. ..... 260/239.3 D, 424/244, 260/239 BD
[51] Int. Cl. ............................................. C07d 53/06
[58] Field of Search ............... 260/239 BD, 239.3 D

[56] References Cited
UNITED STATES PATENTS

| | | | |
|---|---|---|---|
| 2,893,992 | 7/1959 | Sternbach...................... | 260/239 BD |
| 3,121,074 | 2/1964 | Keller et al................... | 260/239 BD |
| 3,299,053 | 1/1967 | Archer et al.................. | 260/239.3 D |
| 3,371,085 | 2/1968 | Reeder et al. ............... | 260/239.3 D |

OTHER PUBLICATIONS

McEvoy et al., "J. Med. Chem.," Vol. 11, pages 1,248–1,250 (1968).
Sternbach et al., "Some Aspects of Structure–Activity Relationship in Psychotropic Agents of the 1,4-Benzodiazepine Series," (A symposison held at the Regional Research Laboratory, Hyderbad, India) C51R, New Delhi, India (1966).

*Primary Examiner*—Henry R. Jiles
*Assistant Examiner*—Robert T. Bond
*Attorney, Agent, or Firm*—James A. Arno; Harry E. Westlake, Jr.; Thomas E. Arther

[57] ABSTRACT

Novel heterocyclic compounds selected from 5-(perfluoroalkoxypheny)-1,3-dihydro-2H-1,4-benzodiazepinones and the correspondingly substituted 5-(perfluoroalkoxyphenyl)-1,4-benzodiazepin-4-oxides are prepared from the correspondingly substituted 5-phenyl-1,3-dihydro-2H-1,4-benzodiazepinones or the correspondingly substituted 5-phenyl-1,4-benzodiazepin-4-oxides by treatment of the unsubstituted compounds with a fluoroxyperfluoroalkane under conditions conducive to the formation of free radicals. The compounds prepared in this manner have central nervous system depressant activity and thus are useful in suppressing anxiety and/or producing depression in warm-blooded animals.

2 Claims, No Drawings

7-CHLORO-1,3-DIHYDRO-5-2-POLYFLUOROALKOXYPHENYL)-2H-1,4-BENZODIAZEPIN-2-ONES

This invention relates to a novel class of heterocyclic compounds which have valuable tranquillizing and/or sedative properties. Also included within the scope of the invention are methods for the preparation of these compounds and pharmaceutical compositions containing these compounds suitable for administration to warm-blooded animals for the purpose of tranquillization and/or sedation. Also included within the scope of the invention are methods of effecting depression of the central nervous system or of suppressing anxiety which comprise administering a compound selected from the group of said benzodiazepine compounds effective in producing depression and/or suppressing anxiety in affected individuals.

The novel medicinally valuable heterocyclic compounds of this invention can be characterized as 5-(perfluoroalkoxyphenyl)-1,3-dihydro-2H-1,4-benzodiazepinones or the correspondingly substituted 5-(perfluoroalkoxyphenyl)-1,4-benzodiazepin-4-oxides.

More particularly, the novel heterocyclic compounds are selected from the group consisting of compounds of the formula

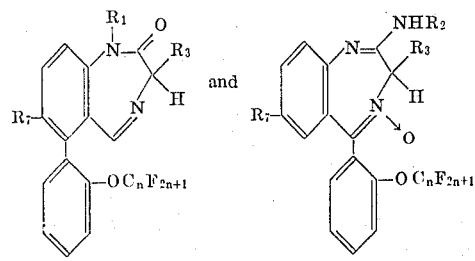

wherein
  $R_1$ is hydrogen or a loweralkyl or alkylaminoalkyl in which the alkyls are from 1–3 carbon atoms, or
  $R_2$ is a loweralkyl substituent of from 1–3 carbon atoms;
  $R_3$ is either hydrogen or hydroxyl;
  $R_7$ is chloro or nitro; and
  $n$ is an integer varying between 1 and 3, inclusive.

Especially preferred compounds within the above identifying groups are compounds in which $R_1$ is hydrogen or a methyl substituent, $R_2$ is a methyl substituent, $R_3$ is hydrogen, $R_7$ is a chloro substituent, and $n$ is 1. The perfluoroalkoxy substituent, especially trifluoromethoxy, is preferably attached at the 2-position of the phenyl ring relative to its position of attachment to the benzodiazepine nucleus.

In addition to the compounds within the scope of the above formulae and also included within the invention are the pharmaceutically acceptable salts of such compounds, including pharmaceutically acceptable acid addition salts. Such salts include acid addition salts with inorganic and organic acids, i.e., with mineral acids, such as hydrochloric acid, hydrobromic acid, sulfuric acid, phosphoric acid, and nitric acid, as well as organic acids, such as tartaric acid, ethanesulfonic acid, naphthalene-1,5-disulfonic acid salt, maleic acid, acetic acid, and the like.

The compounds of the invention are prepared from the correspondingly substituted benzodiazepine compounds lacking a perfluoroalkoxy substituent on the phenyl ring. Preferred compounds included within the scope of our invention are prepared from starting materials described in U.S. Pat. No. 3,109,843, issued Nov. 5, 1963, which patent discloses a variety of 5-phenyl-1,2-dihydro-3H-1,4-benzodiazepines, and in U.S. Pat. No. 2,893,992, issued July 7, 1959, which discloses a variety of 1,4-benzodiazepin-4-oxide compounds, including those having a phenyl substituent attached to the 5-position. A leading reference describing these and other compounds in the 1,4-benzodiazepine series which describes structure-activity relationships in this series and refers to synthetic methods for the preparation of such compounds is one of a series of monographs entitled 'Drugs Affecting the Central Nervous System,' edited by Alfred Burger, particularly chapter 6, 'Structure-Activity Relationships in the 1,4-Benzodiazepine Series,' authored by Sternbach, Randall, Banziger, and Lehr (Marcel Dekker, Inc., New York - 1968).

In accordance with the process of the invention, 5-phenyl-1,3-dihydro-2H-1,4-benzodiazepinones and 5-phenyl-1,4-benzodiazepin-4-oxides of the formula

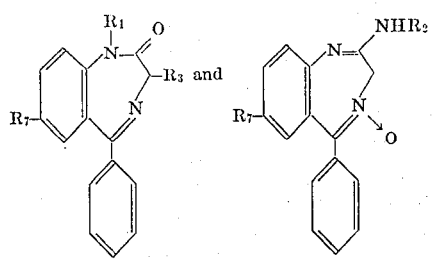

wherein the $R_1$, $R_2$, $R_3$, and $R_7$ substituents are as described hereinabove, are treated in the liquid phase with a fluoroxy perfluoroalkane under conditions conducive to the formation of free radicals. The fluoroxy perfluoroalkane is one which contains an alkyl group of from 1 to 3 carbon atoms such as fluoroxy trifluoromethane, fluoroxy perfluoroethane, and 1 or 2-fluoroxy perfluoropropane. Treatment with this particular reagent has in the past been reported to produce fluorination in a variety or organic compounds. Surprisingly, in the present instance, it is found that the fluoroxy perfluoroalkane selectively effects substitution of the phenyl ring in compounds of the above structure in either the 2, 3, or 4 position of the phenyl substituent with a perfluoroalkoxy substituent to produce the novel compounds of the invention.

The novel process of this invention comprises treating the substrate with a fluoroxy perfluoroalkane under the influence of a free radical initiator such as light which includes ultraviolet light, ionizing radiations such as $\beta$ - or $\gamma$ - rays or microwaves, or chemical chain initiators such as azo compounds, for example azo-bis-isobutyronitrile or combinations of such free radical initiators. One of the preferred modes of operation is to dissolve the substrate in a suitable solvent which is inert to the fluorination reaction, such as fluorotrichloromethane or other similar halogenated alkane, or a strong acid, such as liquid hydrogen fluoride, fluorosulfonic acid, trifluoroacetic acid or sulfuric acid; expose the solution to the free radical initiator; with vigorous stirring and maintainance of temperature, admit the required amount of the fluoroxy reagent slowly to the reaction mixture; and continue agitation and irradiation until reaction is complete.

Use of one of the strong acids as solvent is particularly advantageous in, but not limited to, those instances wherein the substrate carries one or more polar functional groups such as amino, alcohol, carboxyl, alkoxy or the like. In addition, if desired, a strong acid can be employed in combination with one of the non-acidic solvents.

Because of the low boiling point of the reagents it is convenient to conduct the reaction at temperatures as low as −30°C., in which case the reaction proceeds at atmospheric pressure. However, if desired, the reaction can be executed at higher temperatures, for example in the case of trifluoroacetic acid solvent, at −10° to +10°C.

A suitable reaction vessel for atmospheric pressure reactions is one machined from a 'Kel-F' rod equipped with an ultraviolet-transparent window. Alternatively, the reaction can be conducted in a pressure vessel, such as a Hastelloy bomb or a steel bomb with a platinum lining, in which case higher temperatures, for instance up to about 100°C., can be employed. In such case, α-rays or x-rays are used as free radical initiator as these high energy rays penetrate the wall of the reactor.

The above-described process is performed by conventional batch techniques, or alternatively it is run in a continuous manner in a tubular reactor either with or without packing such as Raschig rings, saddles or the like, through which the substrate or its solution and the fluorinating agent are pumped, preferably in a counter-current fashion, while being exposed to radical generating radiation. This method of operation is particularly advantageous in cases where the particular substrate is subject to reaction with the fluoroxy compound even in the absence of radical generating conditions. In this case, by employing the above continuous technique it becomes possible to accelerate the radical type reaction, while leaving unchanged the rate of the non-radical reaction, thus raising the yield of the product formed by radical reaction.

A convenient source of radiation for radical generation is a Hanovia mercury-xenon arc lamp No. 9778-1, run by a 1,000 W. power supply. The lamp was mounted in a Schoeffel 1H 15 1-N Projector equipped with a quartz condensor lens and a heat filter (water).

The novel process of this invention thus provides a convenient route to a variety of novel perfluoroalkoxylated benzodiazepine compounds useful because of their central nervous system depressant properties for effecting sedation in warm-blooded animals affected by agitation, anxiety, tension, and muscle spasm of various origins. The compounds of this invention can readily be tested for this depressant activity using rats trained in a procedure known as a Conditioned Emotional Response. This test situation rewards lever responding (in a standard Skinner box) with sweetened condensed milk on a variable interval schedule, i.e., lever responses are rewarded randomly in time. This schedule generates a steady output of lever responding. Every 10 minutes for a 5-minute period a warning signal (flashing light and clicking sound) is programmed and is accompanied by electric shock occurring randomly in time, averaging once every 2.5 minutes. After a period of training the rats respond steadily in the ' no shock threat ' period, but stop responding during the warning signal even though rewards are available (the experimental anxiety). Given appropriate doses of a minor tranquillizer, the rats will respond throughout the warning signal. This effect is specific for minor tranquillizers; other depressants tend to intensify the suppression of responding.

The novel compounds of the present invention are active in the above test at dosages of from 10–50 mg./kg. in the test animal. In accordance with the present invention, therefore, this group of compounds is useful for administration to warm-blooded animals as central nervous system depressants. This term is used in its ordinary meaning and is intended to include within its purview associated effects, such as muscle relaxant activity, ataractic activity, or tranquillizing activity.

The compounds of the present invention will generally be administered within the range of from 0.1 to 100 mg./day and preferably in the range of 1 to about 50 mg./day to a normal adult human patient. Of course, in general, the physician in the case of a human, or a veterinarian in the case of a small, warm-blooded animal, will determine the dosage which will be most suitable for a particular application and, in accordance with general practice, the dosage will vary with the age, weight, and general health of the animal or human under treatment, and with various other factors necessarily determined by the expertise of the attending physician or veterinarian. The dosages may be in oral or parenteral form and, generally, somewhat larger doses are employed to produce the same effect orally as a smaller quantity given parenterally.

EXAMPLE I

PREPARATION OF
7-CHLORO-1,3-DIHYDRO-5-(2-TRIFLUOROMETHOXYPHENYL)-2H-1,4-BENZODIAZEPIN-2-ONE

7-Chloro-1,3-dihydro-5-phenyl-2H-1,4-benzodiazepin-2-one (6.1 g., 22.5 mmole) is placed in a specially designed ' Kel-F ' reactor equipped with an inlet tube reaching almost to the bottom of the reactor, a second inlet tube for maintaining nitrogen over the reaction mixture, and outlet tube and a magnetic bar. The reactor is cooled to −78° (dry ice-acetone bath) and hydrogen fluoride is condensed (100 ml.). The solid dissolves completely in hydrogen fluoride. The fluoroxytrifluoromethane ($CF_3OF$, 10.2 g., 98 mmole) is first condensed into a graduated tube cooled in liquid nitrogen, attached to a closed system manifold (at atmospheric pressure) and then introduced into the reaction solution slowly in 3 portions over an 8-hour period while the solution is stirred at −78° and irradiated with a 1,000W Xenon-mercury lamp. Irradiation is continued for 15 to 30 minutes after each addition of $CF_3OF$. At the end, the hydrogen fluoride is removed by evaporation at room temperature and the residue (dark brown thick oil) is dissolved in 100 ml. of ethyl acetate, extracted with 2 × 75 ml. of $NaHCO_3$ (saturated solution) and washed with 75 ml. of water. To the organic phase 50 ml. of ethyl acetate is added, extracted with 2 × 75 ml. of 0.5 N HCl to remove unreacted starting material, washed with water, dried over $MgSO_4$, and evaporated to dryness to yield a mixture of products (3.1 g.) as a light brown solid.

The mixture is separated by dry column chromatography (1.2 kg. E. Merck Silica Gel H in a 3-inch diameter column, bed height 33 inches), after dissolving it in 25 ml. of a solvent mixture consisting of acetonitrilebenzene-hexae in volume ratios of 8:6:3. The column is eluted with the same solvent mixture and 5 ml. fractions are collected. Every fifth fraction is checked by gas-liquid chromatography (glc) (glc conditions: Model 202-B Varian Aerograph with a Chromosorb W (calcined diatomite aggregate) column ¼-inch by 5 feet with 3% SE-30. Column temperature 245°, injection at 295°, detector at 290°C. Helium flow rate 60 ml./min.) Three products are isolated:

1. From fractions 51-61: 7-chloro-1,3-dihydro-trifluoromethoxy-5-phenyl-2H-1;4-benzodiazepin-2-one, glc retention time 1.5 minutes.
2. From fractions 86-116: mixture of 7-chloro-1,3-dihydro-5-(3- and 4-trifluoromethoxyphenyl)-2H-1,4-benzodiazepin-2-one. Double peak in glc, 2.4 and 2.6 min.
3. From fractions 132-190: 7-chloro-1,3-dihydro-5-(2-trifluoromethoxyphenyl)-2H-1,4-benzodiazepinone. Glc retention time 1.8 min.

Transformation of the obtained bases into their crystalline hemi salts (i.e., 2 mol. base:1 mol. acid) with naphthalene-1,5-disulfonic acid is illustrated in the example of product No. 3: 280 mg. of the base is dissolved in 6 ml. of isopropanol, then a solution of 250 mg. of naphthalene-1,5-disulfonic acid in 5 ml. of isopropanol is added. The crystalline salt separated is filtered and dried in vacuo to obtain 7-chloro-1,3-dihydro-5(2-trifluoromethoxyphenyl)-2H-1,4-benzodiazepin-2-one naphthalene-1,5-disulfonate.

When the preceding procedure is repeated using the starting materials indicated below in Column I, the products obtained are the corresponding indicated perfluoroalkoxy products in Column III using the indicated perfluoroxyalkane reagent of Column II in place of the fluoroxytrifluoromethane of the preceding paragraph:

EXAMPLE II

PREPARATION OF 7-CHLORO-1-(2-DIETHYLAMINOETHYL)-1,3-DIHYDRO-5-(2-TRIFLUOROMETHOXYPHENYL)-2H-1,4-BENZODIAZEPIN-2-ONE

To a solution of 7-chloro-1,3-dihydro-5-(2-trifluoromethoxyphenyl)-2H-1,4-benzodiazepin-2-one (270 mg., 0.76 mmole) in a 4 ml. of dry dimethyl formamide, 46 mg. (0.85 mmole) of sodium methoxide is added under anhydrous conditions, and the brown solution is stirred at 100° for 15 minutes. Then 115 mg. (0.85 mmole) of 2-chloroethyldiethylamine in 2.1 ml. of dry toluene is added dropwise over a 15-minute period with vigorous stirring at 100°. Stirring and heating is continued for 1.5 hours. The reaction mixture is evaporated in vacuo to a thick oil, quenched with 5 ml. of ice-water, extracted with 2 × 8 ml. of methylene chloride, the organic phase dried over MgSO$_4$ and evaporated to dryness in vacuo. Unreacted starting material is removed by dissolving the crude product in 5 ml. of ethyl acetate and extracting with 2 × 5 ml. of 0.5 N HCl. The acidic solution containing the desired product is basified with 50% NaOH at 0°–5°, extracted with 2 × 10 ml. of ethyl acetate, the organic layer dried over MgSO$_4$ and evaporated to dryness to yield the product, which is converted to the naphthalene disulfonate salt (yield 215 mg.).

When the procedure of the preceding paragraph is repeated using as starting materials each of the products produced in the Example I procedure, the products obtained are respectively:

7-chloro-1-diethylaminoethyl-1,3-dihydro-5-(2-perfluoromethoxyphenyl)-2H-1,4-benzodiazepin-2-one 7-nitro-1-diethylaminoethyl-1,3-dihydro-5-(2-

| COLUMN I<br>STARTING MATERIAL | COLUMN II<br>REAGENT | COLUMN III<br>END PRODUCT |
| --- | --- | --- |
| 7-chloro-1,3-dihydro-5-phenyl-2H-1,4-benzodiazepin-2-one | fluoroxyperfluoro-ethane | 7-chloro-1,3-dihydro-5-(2-perfluoro-methoxyphenyl)-2H-1,4-benzo-diazepin-2-one |
| 7-nitro-1,3-dihydro-5-phenyl-2H-1,4-benzodiazepin-2-one | fluoroxyperfluoro-ethane | 7-nitro-1,3-dihydro-5-(2-perfluoro-ethoxyphenyl)-2H-1,4-benzo-diazepin-2-one |
| 7-nitro-1,3-dihydro-5-phenyl-2H-1,4-benzodiazepin-2-one | fluoroxytrifluoro-methane | 7-nitro-1,3-dihydro-5-(2-trifluoromethoxy-phenyl)-2H-1,4-benzodiazepin-2-one |
| 7-chloro-1,3-dihydro-1-methyl-5-phenyl-2H-1,4-benzodiazepin-2-one | fluoroxytrifluoro-methane | 7-chloro-1,3-dihydro-1-methyl-5-(2-trifluoro-methoxyphenyl)-2H-1,4-benzodiazepin 2-one |
| 7-nitro-1,3-dihydro-1-ethyl-5-phenyl-2H-1,4-benzodiazepin-2-one | fluoroxytrifluoro-methane | 7-nitro-1,3-dihydro-1-ethyl-5-(2-trifluoro-methoxyphenyl)-2H-1,4-benzo-diazepin-2-one |
| 3-hydroxy-1-3-dihydro-5-phenyl-2H-1,4-benzo-diazepin-2-one | fluoroxytrifluoro-methane | 3-hydroxy-1,3-dihydro-5-(2-trifluoromethoxy-phenyl)-2H-1,4-benzodiazepin-2-one |
| 7-chloro-1,3-dihydro-5-phenyl-2H-1,4-benzo-diazepin-2-one | fluoroxyperfluoro-propane | 7-chloro-1,3-dihydro-5-(2-perfluoropropoxy-phenyl)-2H-1,4-benzodiazepin-2-one | perfluoroethoxyphenyl)-2H-1,4-benzodiazepin-2-one 7-nitro-1-diethylaminoethyl-1,3-dihydro-5-(2-trifluoromethoxyphenyl)-2H-1,4-benzodiazepin-2-one 7-chloro-1-diethylaminoethyl-1,3-dihydro-1-methyl-5-(2-trifluoromethoxyphenyl)-2H-1,4-benzodiazepin-2-one 7-nitro-1-diethylaminoethyl-1,3-dihydro-1-ethyl-5-(2-trifluoromethoxyphenyl)-2H-1,4-benzodiazepin-2-one 3-hydroxy-1-diethylaminoethyl-1,3-dihydro-5-(2-trifluoromethoxyphenyl)-2H-1,4-benzodiazepin-2-one 7-chloro-1-diethylaminoethyl-1,3-dihydro-5-(2-perfluoropropoxyphenyl)-2H-1,4-benzodiazepin-2-one

EXAMPLE III

TRIFLUOROMETHOXYLATION OF 7CHLORO-2-METHYLAMINO-5-PHENYL 3H-1,4-BENZODIAZEPIN-4-OXIDE

Chlorodiazepoxide (900 mg., 3mmoles) is dissolved in 40 ml. of trifluoroacetic acid in a specially designed ' Kel-F ' reactor equipped with an inlet tube immersed under the surface of the solution, a second inlet tube for maintaining $N_2$ over the reaction mixture and an outlet tube. The reagent, fluoroxytrifluoromethane ($CF_3OF$, 1.5 g., 14.5 mmole) is first condensed into a graduated tube, cooled in liquid nitrogen, attached to a closed system manifold (at atmospheric pressure) and then introduced into the reaction solution (cooled at 0°–5° in ice bath) over a 3-hour period while stirring. Stirring is continued for an additional hour. Nitrogen is bubbled through the reaction mixture for 15 minutes to remove any unreacted $CF_3OF$, then transferred in a glass flask, and evaporated to dryness in vacuo at room temperature. The oil is quenched with 30 ml. of ice water, 40 ml. of dichloromethane is added, the acidic aqueous phase basified with 2.5 N NaOH and the separated product extracted into the dichloromethane phase. The layers are separated and the aqueous layer is extracted with additional dichloromethane. The combined organic solution is dried over $MgSO_4$ and evaporated to dryness in vacuo at room temperature to a dark brown solid residue (0.88 g., m.p. 122°–130°).

A mass spectroscopy of the product discloses the presence of 4 compounds, one of which has a molecular weight of approximately 299 and is the starting material employed in the reaction, the second of which has a molecular weight of 384 and has the structure 7-chloro-2-methylamino-5-(2-trifluoromethoxyphenyl)-3H-1,4-benzodiazepin-4-oxide (trifluoromethoxy chlordiazepoxide), and the third of which has a molecular weight of 317 and has the structure of monofluoro-chlordiazepoxide. The fourth has a molecular weight of 402 and has the structure of monofluoromonotrifluoromethoxychlordiazepoxide.

EXAMPLE IV

A 10 MILLIGRAM TABLET OF 7-CHLORO-1,3-DIHYDRO-5-(2-TRIFLUOROMETHOXYPHENYL)-2H-1,4-BENZODIAZEPIN-2-ONE

FORMULA

| Ingredient | Amount |
| --- | --- |
| 7-chloro-1,3-dihydro-5-(2-trifluoromethoxyphenyl)-2H-1,4-benzodiazepin-2-one | 10 grams |
| Lactose USP | 65 grams |
| Corn Starch USP | 20 grams |
| Magnesium Stearate USP | 0.5 grams |

A batch of 1,000 10 mg. tablets of 7-chloro-1,3-dihydro-5-(2-trifluoromethoxyphenyl)-2H-1,4-benzodiazepin-2-one is prepared by mixing the ingredients listed above as follows:

The 7-chloro-1,3-dihydro-5-(2-trifluoromethoxyphenyl)-2H-1,4-benzodiazepin-2-one, lactose and a portion of the corn starch are mixed and granulated with a 10% corn starch paste. The resulting granulation is sieved and blended with magnesium stearate and the remainder of the corn starch. The resulting granulation is then compressed into tablets containing 10 mg. of 7-chloro-1,3-dihydro-5-(2-trifluoromethoxyphenyl)-2H-1,4-benzodiazepin-2-one per tablet. Corresponding tablets containing respectively 2 mg., 5 mg. and 20 mg. of 7-chloro-1,3-dihydro-5-(2-trifluoromethoxyphenyl)-2H-1,4-benzodiazepin-2-one per tablet are prepared using the same procedure but varying the amount of 7-chloro-1,3-dihydro-5-(2-trifluoromethoxyphenyl)-2H-1,4-benzodiazepin-2-one added to the mixture in the appropriate ratio.

The procedure is repeated using as the active pharmaceutical ingredient in place of 7-chloro-1,3-dihydro-5-(2-trifluoromethoxyphenyl)-2H-1,4-benzodiazepin-2-one each of the products named in the preceding examples.

EXAMPLE V

A FILM-COATED TABLET OF 7-CHLORO-1,3-DIHYDRO-5-(2-TRIFLUOROMETHOXYPHENYL)-2H-1,4-BENZODIAZEPIN-2-ONE

FORMULA

| Ingredient | Amount |
| --- | --- |
| 7-chloro-1,3-dihydro-5-(2-trifluoromethoxyphenyl)-2H-1,4-benzodiazepin-2-one | 10 mg. |
| Lactose USP | 107 mg. |
| Corn Starch USP | 32 mg. |
| Magnesium Stearate USP | 1 mg. |

Appropriate multiples of the above amounts are used as required.

The 7-chloro-1,3-dihydro-5-(2-trifluoromethoxyphenyl)-2H-1,4-benzodiazepin-2-one, lactose, and a portion of the corn starch are mixed and granulated with a 10% corn starch paste. The resulting granulation is sieved, dried, and blended with the remainder of the corn starch and the magnesium stearate. The resulting granulation is then compressed into tablets containing 10 mg. of 7-chloro-1,3-dihydro-5-(2-trifluoromethoxyphenyl)-2H-1,4-benzodiazepin-2-one per tablet.

FORMULA FOR FILM COATING

| Ingredient | Amount |
| --- | --- |
| Hydroxypropylmethylcellulose | 1.28 mg. |
| Hydroxypropylcellulose | 1.28 mg. |
| Titanium dioxide | 0.35 mg. |
| Yellow Light Lemon Dye | 0.09 mg. |
| Ethanol anhydrous | 43.00 ml. |
| Chloroform NF | 43.00 ml. |

The amounts of ingredients are appropriately multiplied for the number of tablets required to be coated. Dissolve with agitation the hydroxypropylmethylcellulose and the anhydrous ethanol and add with mixing the hydroxypropylcellulose, titanium dioxide and the Yellow Light Lemon Dye and chloroform. When the mixture is homogeneous, it is homogenized and used to film coat the appropriate number of tablets.

Similar tablets of 2.5, 5 and 25 mg. are prepared using minor variations in the formulation, as follows:

| Ingredient | Amount | | |
|---|---|---|---|
| | 2.5 mg. | 5 mg. | 25 mg. |
| 7-chloro-1,3-dihydro-5-(2-trifluoromethoxyphenyl)-2h-1,4-benzodiazepin | 2.5 mg. | 5.0 mg. | 25.0 mg. |
| Lactose USP | 56.1 mg. | 72.0 mg. | 210.0 mg. |
| Corn Starch USP | 16.0 mg. | 23.0 mg. | 69.0 mg. |
| Magnesium Stearate USP | 0.4 mg. | 0.5 mg. | 1.8 mg. |

What is claimed is:
1. A compound having the structure:

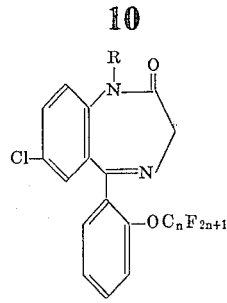

wherein R is H or lower alkyl having from 1 to 3 carbon atoms; $n$ is 1, 2 or 3; and the acid addition salts thereof.

2. The compound of claim 1 wherein R is H and $n$ is 1 which is 7-chloro-1,3-dihydro-5-(2-trifluoromethoxyphenyl)-2H-1,4-benzodiazepin-2-one.

* * * * *